United States Patent
Teng et al.

(10) Patent No.: US 7,299,991 B2
(45) Date of Patent: Nov. 27, 2007

(54) REFLECTIVE MEMBERS FOR USE IN ENCODER SYSTEMS

(75) Inventors: Kong Leong Teng, Tanjung Bungah (MY); Kee Yean Ng, Prai (MY); Hon-Choong Yip, Penang (MY); Douglas W. Pocius, Sunnyvale, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1141 days.

(21) Appl. No.: 10/409,544

(22) Filed: Apr. 8, 2003

(65) Prior Publication Data

US 2004/0200957 A1   Oct. 14, 2004

(51) Int. Cl.
*G06K 7/10*       (2006.01)
*G06K 19/06*     (2006.01)

(52) U.S. Cl. .................. 235/494; 235/462.01

(58) Field of Classification Search ............. 235/494, 235/462, 472.01, 472.02, 472.03, 454, 455, 235/456, 432

See application file for complete search history.

(56) References Cited

U.S. PATENT DOCUMENTS

| | | | | |
|---|---|---|---|---|
| 5,646,730 A | * | 7/1997 | Mitchell et al. | ............. 356/499 |
| 5,988,513 A | * | 11/1999 | Dean et al. | ................. 235/494 |
| 6,663,790 B2 | * | 12/2003 | Kowarz et al. | ................ 216/24 |
| 6,707,595 B2 | * | 3/2004 | Kutz et al. | .................... 359/291 |
| 6,782,027 B2 | * | 8/2004 | Cox et al. | ...................... 372/50 |
| 6,827,283 B2 | * | 12/2004 | Kappe et al. | ................ 235/494 |
| 2004/0184151 A1 | * | 9/2004 | Schilling et al. | ............ 359/529 |

\* cited by examiner

*Primary Examiner*—Thien Minh Le

(57) ABSTRACT

Reflective members for use in encoder systems are provided. One embodiment comprises a reflective member comprising a reflective layer, at least another layer, and a reflective pattern comprising a first portion having a first reflective property and a second portion having a different reflective property. The reflective layer forms at least a part of the reflective pattern. In addition, the aforementioned first portion of the reflective member has a width of less than half of the grating period. The reflective member enables measurement of at least one operational attribute of an object.

32 Claims, 4 Drawing Sheets

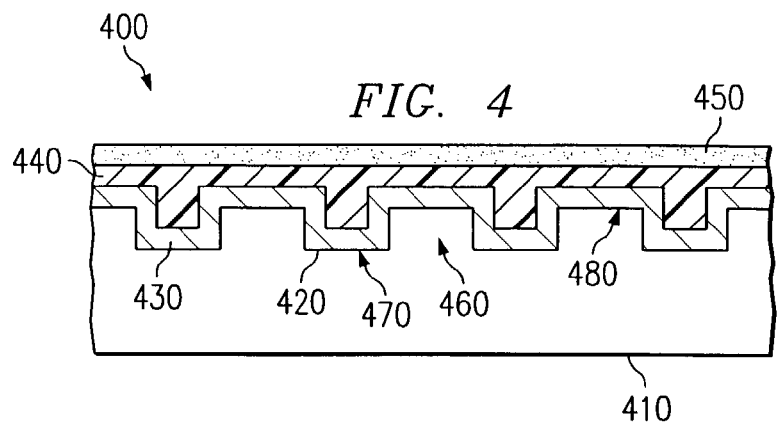
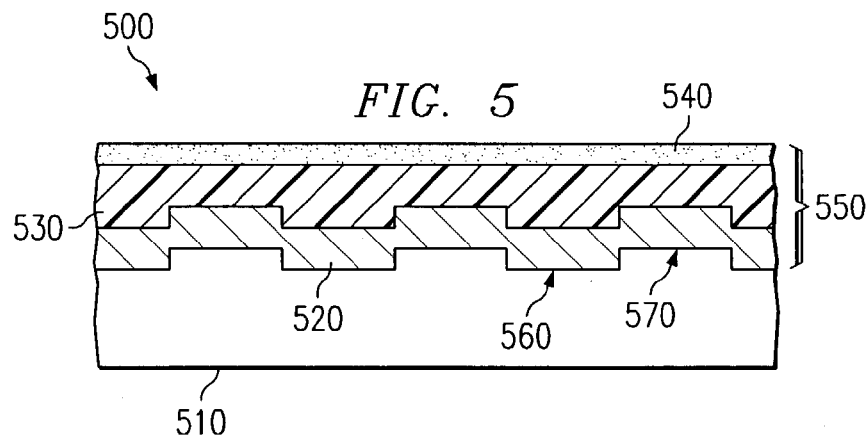
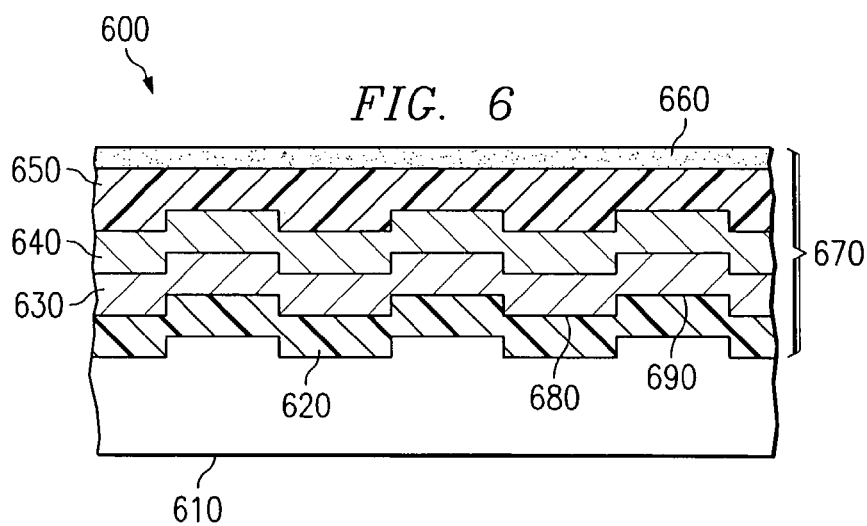

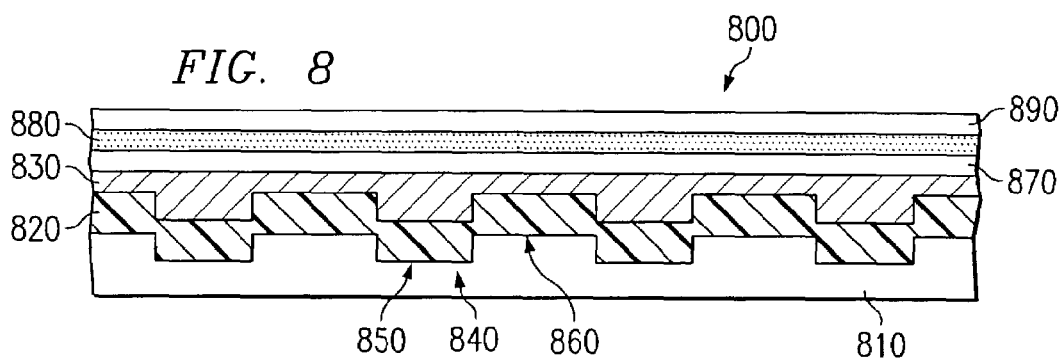
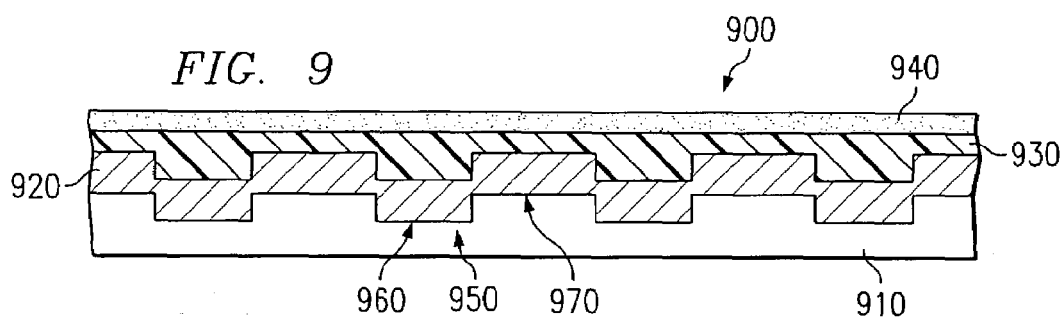
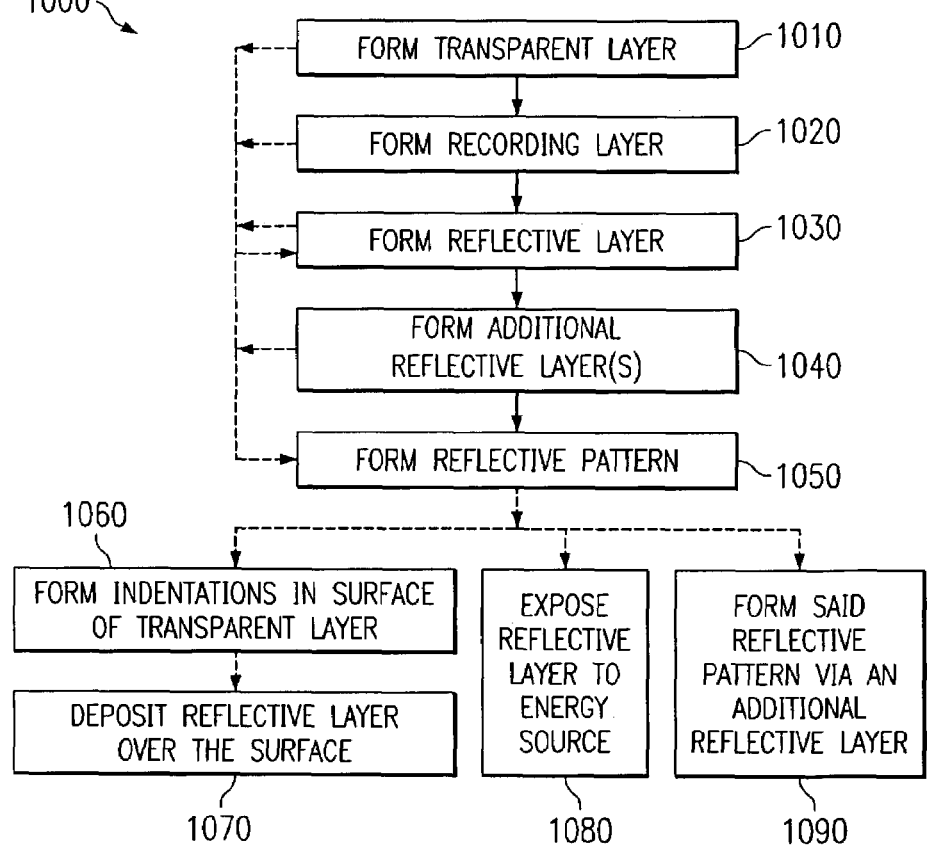

REFLECTIVE MEMBERS FOR USE IN ENCODER SYSTEMS

TECHNICAL FIELD

The present invention relates in general to encoder systems and in particular to reflective members for use in encoder systems.

BACKGROUND OF THE INVENTION

In the present environment, an encoder system measures one or more operational attributes of an object (e.g., a rotary shaft, a printer head, a paper feeder). Examples of such operational attributes include the linear position of the object, the rotary position of the object, the speed of the object, and the like. In some existing encoder systems, measurement of one or more operational attributes of an object involves an emitter of the encoder system focusing light onto a codewheel or codestrip moving in conjunction with the object. The light is either reflected or not reflected to a receiver of the encoder system depending upon the "bar and window" pattern of the codewheel or codestrip. In existing reflective encoder systems, the "bar and window" pattern of the codestrip or codewheel consists of a repeating pattern of a non-reflective surface (i.e., the bar) and a reflective surface (i.e., the window). The total width of the non-reflective surface and the reflective surface is known as the grating period of the codewheel/codestrip pattern. As the codewheel or codestrip moves, an alternating pattern of light and dark corresponding to the pattern of the codewheel or codestrip falls upon the receiver. This collected light pattern is used to produce internal signals, which in turn are used to determine the earlier-mentioned measurements.

FIG. 1 depicts an exemplary prior art bar and window pattern for existing codestrips and codewheels. In FIG. 1, pattern 100 includes window 110 and bar 120. Bar 120 has a width $w_1$. Likewise, window 110 has a width $w_2$, thus creating a grating period of $w_1+w_2$. In some existing codewheels and codestrips, $w_1$ is equal to $w_2$. Moreover, for existing codestrips and codewheels, the value of $w_1$, as well as that of $w_2$, is usually greater than or equal to 1.6 µm to allow formation of part window patterns.

The precision of the aforementioned measurements depends upon the resolution of the codewheel or codestrip. The resolution of a codestrip is equal to the number of lines (i.e., bar and window pairs) formed by the codestrip per unit length of the codestrip (e.g., per inch, per mm, etc.). Furthermore, the resolution of a codewheel is equal to the counts per revolution (CPR) for the codewheel. The CPR for a codewheel may be determined using the following equation.

$$CPR=LP \times 2\pi R_{OP}$$

where LP=the number of lines per unit length (e.g., per inch, per mm, etc.); and
$R_{OP}$=radius of the codewheel As can be seen from the above-equation, the resolution of a codewheel may be increased by increasing $R_{OP}$, while keeping LP constant. However, size constraints for encoder systems may make increasing the size of the codewheel impractical.

Moreover, similar to earlier discussions, present techniques only allow so many bar and window pairs per unit length using existing codewheel or codestrip manufacture technologies (e.g., stamping windows into a codestrip or codewheel, printing opaque bars on the surface of a codestrip or codewheel, etc.). Therefore, increasing the LP of a codewheel or a codestrip to increase the resolution is also impractical. Using the maximum LP values, CPR values of up to 32, 768 have been achieved.

SUMMARY

The present invention is directed to high-resolution reflective members for use in encoder systems. These reflective members may be codestrips, codewheels, and/or the like. One embodiment of the present invention allows for a higher density of bar and window pairs per given unit length, and, therefore, a higher resolution, than that which is achievable through existing methods of manufacturing codestrips or codewheels. For example, bars and/or windows having widths of less than half of the grating period, such as less than 1.6 µm, may be achieved. In some embodiments, such dimensions are achieved by using layering techniques similar to those employed in the manufacture of compact discs (CD), digital versatile discs (DVD), and/or other similar technologies in the manufacture of reflective members for use in encoder systems.

One embodiment of the present invention comprises a reflective member enabling the measurement of at least one operational attribute of an object associated with the reflective member. This reflective member comprises a reflective layer and at least another layer. In some embodiments, the reflective layer is a non-recording layer (e.g., a layer of aluminum, gold, and/or other metal).

Moreover, the reflective layer forms at least a part of a reflective pattern comprising a first portion having a first reflective property (e.g., a window) and at least one other portion having a different reflective property (e.g., a bar). Furthermore, the pattern may comprise a repeating pattern of the first portion and one of at least one other portion. The first and second portions may have widths of less than half of the grating period, such as less than 1.6 µm. In some embodiments, at least one dimension of the first portion is equal to at least one dimension of the second portion. The first and second portions may be formed by any means, now known or later developed, for manufacturing a compact disc, a digital versatile disc, and/or other similar technologies.

As mentioned, the reflective member may comprise other layers besides the earlier-discussed reflective layer. For example, the reflective member may comprise a transparent layer (e.g., a polycarbonate plastic layer). Moreover, in some embodiments, the reflective member comprises more than one reflective layer. Furthermore, a second repeating pattern of portions having different reflective properties may be formed, at least in part, by one of these other reflective layers. Other non-limiting examples of such additional layers of the reflective member include dielectric layers, lacquer layers, adhesive layers, substrate layers, etc.

Another embodiment of the present invention comprises an encoder system employing at least one of the aforementioned reflective members. The encoder system comprises at least one emitter operable to focus a signal(s) on one of the aforementioned reflective members moving in conjunction with an object. The system also comprises at least one detector operable to collect signal(s) reflected from the reflective member. The encoder system is operable to measure at least one operational attribute of the aforementioned object from the reflected signal pattern collected by the at least one detector.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 depicts a cross-section of a first exemplary reflective member in accordance with an embodiment of the present invention;

FIG. 5 depicts a cross-section of a second exemplary reflective member in accordance with an embodiment of the present invention;

FIG. 6 depicts a cross-section of a third exemplary reflective member in accordance with an embodiment of the present invention

FIG. 8 depicts a cross-section of an eighth exemplary reflective member in accordance with an embodiment of the present invention;

FIG. 9 depicts a cross-section of a ninth exemplary reflective member in accordance with an embodiment of the present invention; and FIG. 10 depicts exemplary steps of a method for forming a reflective member in accordance with an embodiment of the present invention.

DETAILED DESCRIPTION OF THE INVENTION

Figure 1:
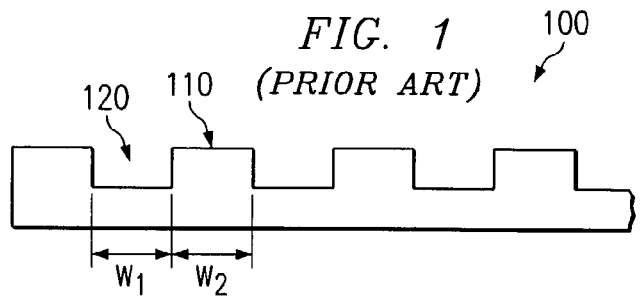
FIG. 1 depicts an exemplary bar and window pattern for existing codewheels and codestrips.
Figure 2:
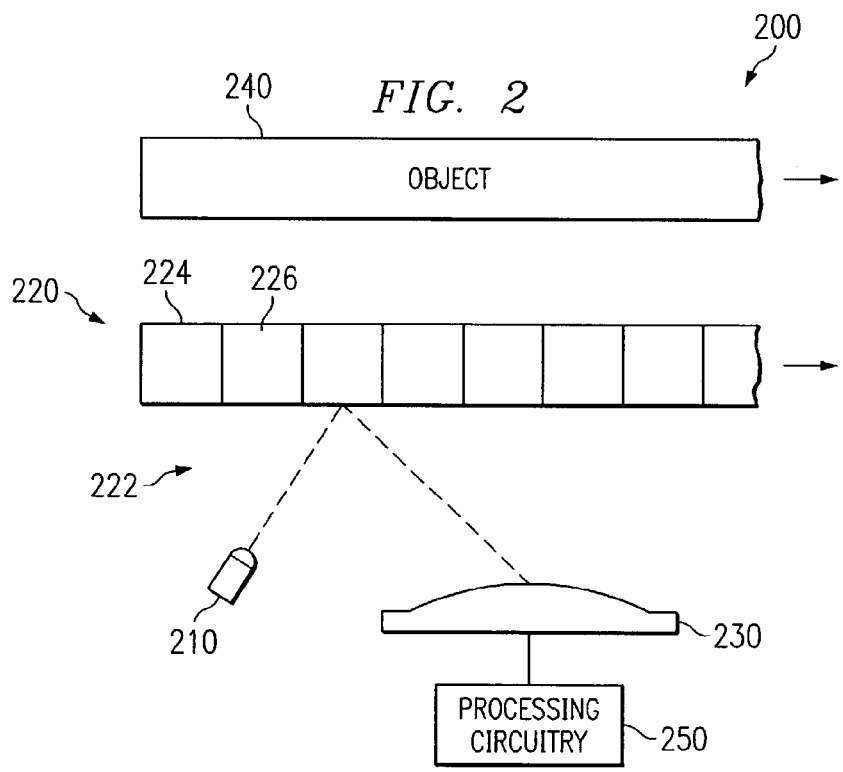
FIG. 2 depicts an encoder system in accordance with an embodiment of the present invention.

FIG. 2 depicts an exemplary encoder system in accordance with an embodiment of the present invention. In the illustrated embodiment, encoder system 200 comprises emitter 210, reflective member 220, detector 230, and processing circuitry 250. In one embodiment, emitter 210 focuses at least one signal on reflective member 220 as reflective member 220 moves in conjunction with object 240. Depending upon reflective pattern 222 of reflective member 220, at least a portion of these signals are reflected by reflective member 220 towards detector 230. These reflected signals are then received at detector 230. Detector 230 in turn generates signals based upon the pattern of reflected signals received thereby. In some embodiments, these are communicated to processing circuitry 250, which determines one or more operational attributes of object 240 therefrom.

Object 240 may be any object, now known or later developed, that moves during the operation thereof or during the operation of a device, machine, system, etc., of which object 240 is a part. Non-limiting examples of such objects include components of printers, copiers, card readers, plotters, tape drivers, industry and factory automation equipment, vending machines, motor manufacturing applications, consumer product applications, machine tools, and/or the like. Moreover, object 240 may comprise more than one of such objects.

The operational attributes determined by encoder system 200 may be one or more position and/or motion attributes of object 240. Non-limiting examples of such operational attributes include the linear speed of object 240, the rotary speed of object 240, the direction of movement of object 240, the linear position of object 240, the rotary position of object 240, the displacement of object 240, the rotation angle of object 240, the frequency of object 240, the acceleration of object 240, and/or the like.

Emitter 210 may be any device (or group of devices), now known or later developed, that is operable to emit signals. For example, emitter 210 may comprise a laser. In one embodiment, emitter 210 comprises an infrared laser (e.g., a 780 nm laser). However, in another embodiment, emitter 210 comprises a red laser (e.g., a 635 nm or 650 nm laser). Emitter 210 may comprise a blue, ultra violet (UV), or similar laser diode (e.g., a gallium arsenate semiconductor with a wavelength typically between 250-480 nm). Moreover, in one embodiment, the focal length of emitter 210 may be varied such that the focus of emitter 210 may be switched from one reflective pattern of reflective member 220 to another reflective pattern thereof (described in greater detail below).

Similarly, detector 230 may be any device (or group of devices), now known or later developed, that is operable to detect signals. In one embodiment, detector 230 is operable to detect signals having a small wavelength (e.g., laser signals). In some embodiments, detector 230 comprises a photodetector.

Processing circuitry 250 may comprise any circuitry, now known or later developed, operable to determine operational attributes of an object from a reflected signal pattern received by detector 230. Non-limiting examples of such circuitry include timing circuitry, sinusoidal output circuitry, transistor-transistor logic (TTL) circuitry, quadrature circuitry, interpolation circuitry (e.g., DSP or ASIC interpolation circuitry), comparators, push-pull detectors, binary and/or Grey-code pattern readers, and/or the like. In some embodiments, circuitry 250 comprises one or more circuit elements, now known or later developed, that are employed in CD players, CD drives, DVD players, DVD drives, and/or the like.

Reflective member 220 may comprise a variety of different materials (discussed in detail below). Moreover, reflective member 220 may have various shape and sizes. In one embodiment, the shape and size of a particular reflective member depends upon the size and shape constraints of the encoder system in which it is employed. For example, in one embodiment, reflective member 220 has a circular shape. In an alternative embodiment, reflective member has a non-circular shape (e.g. a rectangular shape). Reflective member 220 may be a codewheel, a codestrip, and/or the like.

As mentioned, reflective member 220 comprises reflective pattern 222. In the illustrated embodiment, reflective pattern 222 comprises a first portion 224 having a first reflective property and a second portion 226 having a different reflective property. As a result, signals are reflected differently by first portion 224 than they are by second portion 226. In some embodiments, one of these portions may be non-reflective. There may be more than two different types of reflective portions if desired. First portion 224 and second portion 226 may possess a variety of sizes and shapes.

Figure 3:
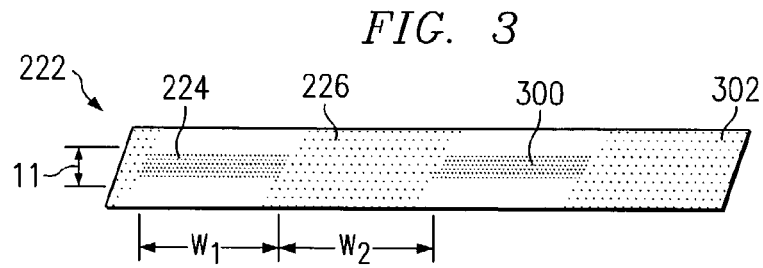
FIG. 3 depicts an isometric view of an exemplary reflective pattern in accordance with an embodiment of the present invention.

FIG. 3 depicts exemplary shapes and sizes for first portion 224 and second portion 226. In the illustrated embodiment, first portion 224 has a width $w_1$, a length $l_1$, and a height $h_1$ (not shown). Similarly, second portion 226 has a width $w_2$ and a length $l_2$. Second portion 226 may also have a height $h_2$ (not shown). Both $w_1$ and $w_2$ may have widths of less than half of the grating period, such as less than 1.6 µm.

In some embodiments, $w_1$ may have values as low as 0.835 µm, $l_1$ may have values as low as 0.5 µm, and $h_1$ may have values as low as 0.125 µm. Furthermore, in other embodiments, $w_1$ may have values as low as 0.4 µm and lower, $l_1$ may have values as low as 0.32 µm and lower, and $h_1$ may have values as low as 0.12 µm and lower. In one embodiment, at least one of $w_1$, $l_1$, and $h_1$ is equal to at least one of $w_2$, $l_2$, and $h_2$.

It will be appreciated that reflective pattern 222 may comprises other portions besides first portion 224 and second portion 226. In the illustrated embodiment, reflective pattern 222 further comprises third portion 300 and fourth portion 302. Third portion 300 and fourth portion 302 may have different reflective properties. Furthermore, portion 300 and/or portion 302 may have a reflective property different from that of first portion 224 and/or second portion 226. Likewise, third portion 300 and fourth portion 302 may have different shapes and sizes. Moreover, third portion 300 and fourth portion 302 may have different shapes and sizes than those of first portion 224 and second portion 226. It will be appreciated that sizes and shapes of first portion 224, second portion 226, third portion 300, and fourth portion 302 depicted in FIG. 3 are by way of example only.

In some embodiments, reflective pattern 222 comprises a repeating pattern of first portion 224 and second portion 226. For the illustrated embodiment, this means that third portion 300 is identical to first portion 224 and fourth portion 302 is identical to second portion 226.

As mentioned, during the operation of encoder system 200, reflective member 220 moves in conjunction with object 240. Such coordinated movements may be accomplished through any means, now known or later developed, for coordinating the of two objects. For example, in one embodiment, reflective member 220 is mounted to object 240.

It will be appreciated that the elements of encoder system 200 depicted in FIG. 2, as well as the arrangement thereof, is by way of example only. System 200 may comprise more, fewer, and/or different components than that depicted in FIG. 2. Furthermore, the components of encoder system 200 may be arranged differently than that depicted in FIG. 2. As an example of the above, encoder system 200 may comprise a scale graduation, a scanning reticle, one or more lenses (e.g., an objective lens, a collimator lens, etc.), a beam splitter, defraction grating, and/or the like. Moreover, encoder system 220 may comprise more than one emitter and/or more than one detector. Furthermore, for some of these embodiments, the emitters and/or the detectors are situated on opposite sides of reflective member 220.

As discussed earlier, reflective member 200 may comprise a variety of materials, and may be manufactured in a variety of different ways. In some embodiments, reflective member 220 comprises those materials found in compact discs.

In FIG. 4, reflective member 400 comprises transparent layer 410. Transparent layer 410 may comprise any transparent material, known or later developed. In one embodiment, transparent layer 410 comprises a plastic, such as polycarbonate plastic. One or more indentations 420 may be formed in transparent layer 410 (e.g., by mechanically impressing the indentations therein).

In addition or in the alternative of the above, reflective member 400 may comprise reflective layer 430. Reflective layer 430 may be situated adjacent to transparent layer 410. Furthermore, reflective layer 430 may comprise any material, now known or later developed, operable to reflect energy signals (e.g., laser light). Non-limiting examples of such materials include aluminum and/or other metals, as well as alloys thereof.

In the illustrated embodiment, undulations in reflective layer 430, due, at least in part, to indentations 420, form reflective pattern 460. In one embodiment, first portion 470 of reflective pattern 460 reflects the aforementioned signals focused thereon by emitter 210 (i.e., first portion 470 comprises a window), while second portion 480 does not (i.e., second portion 480 comprises a bar). In an alternative embodiment, both first portion 470 and second portion 480 reflect signals. However, those signals reflected by first portion 470 have different characteristics than those signals reflected by second portion 480 (e.g., they may be 180° out of phase). First portion 470 is sometimes referred to as a "land", while second portion 480 is sometimes referred to as a "bump" or a "pit". In one embodiment, first portion 470 may have dimensions as small as 0.5 µm in length, 0.83 µm in width, and/or 0.125 µm in height. Second portion 480 may also have dimensions as small as 0.5 µm in length, 0.83 µm in width, and/or 0.125 µm in height.

Reflective pattern 460 may comprise other lands and pits besides first portion 470 and second portion 480. Moreover, these other portions of reflective pattern 460 may have sizes and/or reflective properties different from those of first portion 470 and/or second portion 480. In the illustrated embodiment, reflective pattern 460 comprises a repeating pattern of first portion 470 and second portion 480.

As mentioned, reflective member 220 may comprise materials used in compact discs. In existing compact discs, lands and pits are arranged in a spiral-pattern. However, in the illustrated embodiment, reflective pattern 460 is circular-shaped.

In addition to the above-discussed layers, reflective member 400 may comprise a thin acrylic layer 440 (e.g., a synthetic paint) sprayed over the reflective layer to protect it. A label 450 may be added to the acrylic layer. In one embodiment, reflective member 400 is 1.2 mm thick.

FIG. 5 depicts a cross-section of another embodiment of reflective member 220 (FIG. 2). In FIG. 5, reflective member 500 comprises materials used in recordable CDs (CD- Rs). For example, in the illustrated embodiment, reflective member 500 comprises a transparent layer 510. Transparent layer 510 may comprise any transparent material, known or later developed. In one embodiment, transparent layer 510 comprises plastic, such as polycarbonate plastic, acrylic, polystyrene, polyethylene, or the like.

In addition to or in the alternative of transparent layer 510, reflective member 500 may comprise reflective layer 530. Reflective layer 530 may be situated adjacent to transparent layer 510. Reflective layer 530 may comprise any material, now known or later developed, operable to reflect energy signals (e.g., laser light). Non-limiting examples of such materials include gold, silver and/or other metals, as well as alloys thereof.

However, unlike reflective member 400 (FIG. 4), for reflective member 500, recording layer 520, in combination with reflective layer 530, forms reflective pattern 550. Recording layer 520 may comprise a dye whose reflectance is changed by the application of energy signals (e.g., laser light) thereto. Non-limiting examples of such dye include photosensitive organic compounds such as cyanine dye, its metal-stabilized derivative, phthalocyanine dye, azo dye, etc.

Moreover, reflective pattern 550 is formed, at least in part, by an energy source (e.g., emitter 210) physically "burning" at least one portion of recording layer 520. For example, in one embodiment, the aforementioned energy source directs energy signals (e.g., laser light) at recording layer 520 while reflective member 500 is in motion. These energy signals heat an area of recording layer 520 beyond a critical temperature. As a result, the heated area is distorted in some manner. Such distortion may be a bleaching of the dye in that area of recording layer 520, a distortion of transparent layer 510 in that area, or the formation of a bubble in that area of recording layer 520. The size of the distortion depends upon the duration of the exposure of recording layer 520 to the energy signals. Furthermore, for this distorted area of recording layer 520, signals (e.g., laser light) are prevented from reaching reflective layer 530 (i.e., the distortion absorbs and/or redirects the signal). Meanwhile, those areas of recording layer 520 that were not burned, allow signals to reach reflective layer 530.

The aforementioned distorted area of recording layer 520, at least in part, comprises second portion 570 of reflective pattern 550. An area of recording layer 520 that is not altered by the energy source, at least in part, comprises first portion 560 of reflective pattern 550. Thus, in one embodiment, for first portion 560, the aforementioned signals focused on reflective member 220 by emitter 210 are able to pass through recording layer 520 and reflect off reflective layer 530 to detector 230. Meanwhile, for second portion 570, the signals may be scattered by the distortion and, therefore, are not reflected to detector 230. In an alternative embodiment, some signals are reflected by second portion 570, but a smaller amount than that which is reflected by first portion 560. Accordingly, first portion 560 may act as a window, while second portion 570 may act as a bar. In one embodiment, first portion 560 may have dimensions as small as 0.5 μm in length, 0.83 μm in width, and/or 0.125 μm in height. Second portion 570 may have at least one dimension that is equal in size to that of first portion 560.

More than one distortion may be formed in recording layer 520. Thus, reflective pattern 550 may have portions besides first portion 560 and second portion 570. Moreover, these other portions may have sizes and/or reflective properties different from those of first portion 560 and/or second portion 570. In the illustrated embodiment, reflective pattern 550 comprises a repeating pattern of first portion 560 and second portion 570. Moreover, reflective pattern 550 may have a circular-shape.

In the illustrated embodiment, reflective member 500 also comprises a thin acrylic layer 550 (e.g., a synthetic paint) sprayed over the reflective layer to protect it. A label (not shown) may be printed onto the acrylic layer. In one embodiment, reflective member 500 has a thickness of 1.2 mm.

FIG. 6 depicts a cross-section of yet another exemplary embodiment of reflective member 220 (FIG. 2). In FIG. 6, reflective member 600 comprises materials used in rewritable CDs (CD-RWs). For example, reflective member 600 comprises a transparent layer 610. Transparent layer 610 may comprise any transparent material, known or later developed. In one embodiment, transparent layer 510 comprises a plastic, such as polycarbonate plastic.

In addition or in the alternative, reflective member 600 may comprise reflective layer 650. Reflective layer 650 may comprise any material, now known or later developed, which is operable to reflect energy signals (e.g., laser light). Non-limiting examples of such materials include aluminum and/or other metals, as well as alloy thereof.

In the illustrated embodiment, recording layer 630, in combination with reflective layer 650, forms reflective pattern 670. Recording layer 630 comprises a phase-change material. In one embodiment, this phase-change material comprises a crystalline compound that is operable to obtain a crystalline structure when heated to a first temperature and allowed to cool, as well as being operable to obtain a non-crystalline structure (e.g., an amorphous structure) when heated to a different temperature and allowed to cool. In one embodiment, this crystalline compound comprises a mix of silver, indium, antimony and tellurium. It will be appreciated, however, the recording layer 630 may comprise other phase-change materials.

Furthermore, to form reflective pattern 670, an energy source (e.g., emitter 210 (FIG. 2)) physically burns at least one portion of recording layer 630. For example, in one embodiment, initially, the aforementioned crystalline compound is in a crystalline state. However, the earlier-discussed energy source directs energy signals (e.g., laser light) at recording layer 630 while reflective member 600 is in motion. As a result, an area of recording layer 630 is heated beyond a critical temperature (e.g., 500-700° C.), such that all the atoms in this area can move rapidly in the liquid state. Then, if cooled sufficiently quickly, the random liquid state is locked in and an amorphous state is obtained. The size of this amorphous area depends upon the duration of the exposure, of recording layer 630 to the energy signals.

This area of recording layer in the amorphous state, at least in part, comprises second portion 690 of reflective pattern 670. An area of recording layer 630 that is not altered by the energy source (i.e., an area in the crystalline state) comprises first portion 680. The crystalline area allows signals to pass therethrough, while the amorphous area absorbs at least a portion of the signals. As a result, for first portion 680, the aforementioned signals from emitter 210 are able to pass therethrough recording layer 630 and reflect off of reflective layer 650 towards detector 230. Meanwhile, for second portion 690, at least a portion of the signals are absorbed by the amorphous material, and therefore, fewer signals, if any at all, are reflected to detector 230. Thus, in the illustrated embodiment, first portion 680 acts as a window, while second portion 690 acts as a bar. In one embodiment, first portion 680 may have dimensions as small as 0.5 μm in length, 0.83 μm in width, and/or 0.125 μm in height. Second portion 690 have at least one dimension that is equal in size to that of first portion 680.

More than one amorphous area may be formed in recording layer 630. Thus, reflective pattern 670 may have portions besides first portion 680 and second portion 690. Moreover, these other portions may have sizes and/or reflective properties different from those of first portion 680 and/or second portion 690. In the illustrated embodiment, reflective pattern 670 comprises a repeating pattern of first portion 680 and second portion 690. Furthermore, reflective pattern 670 may be in the shape of a circle.

The areas of recording layer 630 in the amorphous state may be returned to the crystalline state by heating such areas (e.g., by the aforementioned energy source) to below the melting temperature of the crystalline compound but above the crystallization temperature (e.g., 200° C.) for a sufficient time (at least longer than the minimum crystallization time) to revert the atoms back to the crystalline state. These areas and/or other areas of recording layer 630 may then be transformed to the amorphous state via the above-described process.

In the illustrated embodiment, reflective member 600 also comprises dielectric layers 620 and 630. These layers may draw excess heat from recording layer 630 during the aforementioned burning process. In addition or in the alternative, reflective member 600 may comprise a thin acrylic layer 660 (e.g., a synthetic paint) sprayed over the reflective layer to protect it. A label (not shown) may be printed onto the acrylic layer. In one embodiment, reflective member 600 has a thickness of 1.2 mm.

Thus, as discussed above, reflective member 220 may comprise one or more materials used in CDs. However, it will be appreciated that reflective member 220 may comprise other materials. For example, reflective member 220 may comprise one or more materials used in DVDs.

Figure 7A:
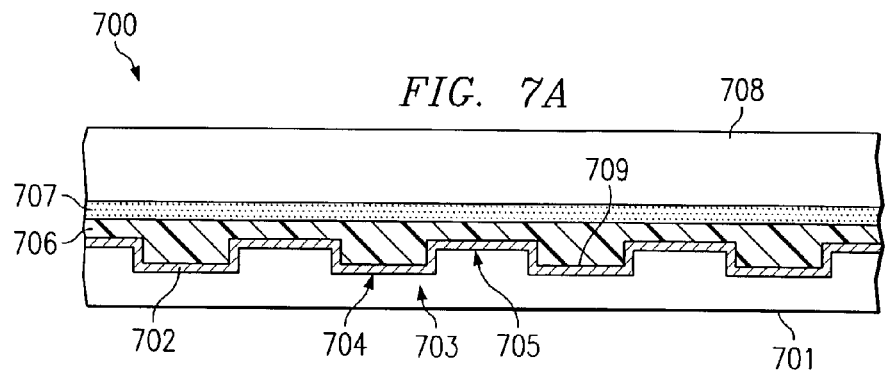
FIG. 7A depicts a cross-section of a fourth exemplary reflective member in accordance with an embodiment of the present invention.
Figure 7B:
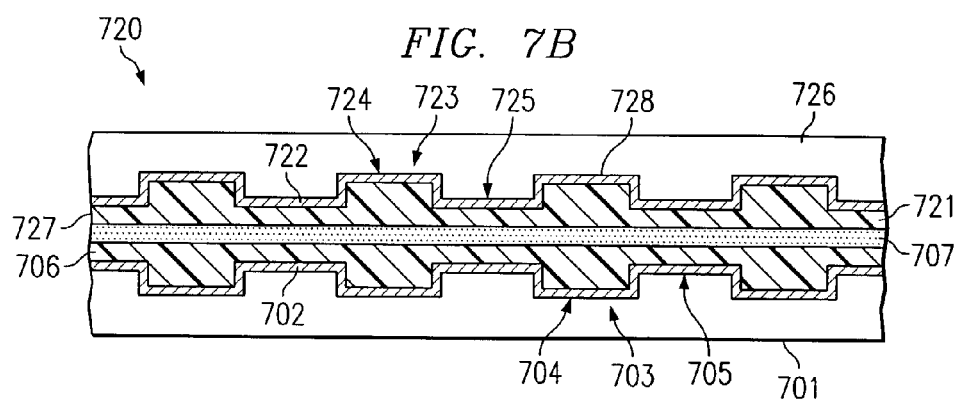
FIG. 7B depicts a cross-section of a fifth exemplary reflective member in accordance with an embodiment of the present invention.
Figure 7C:
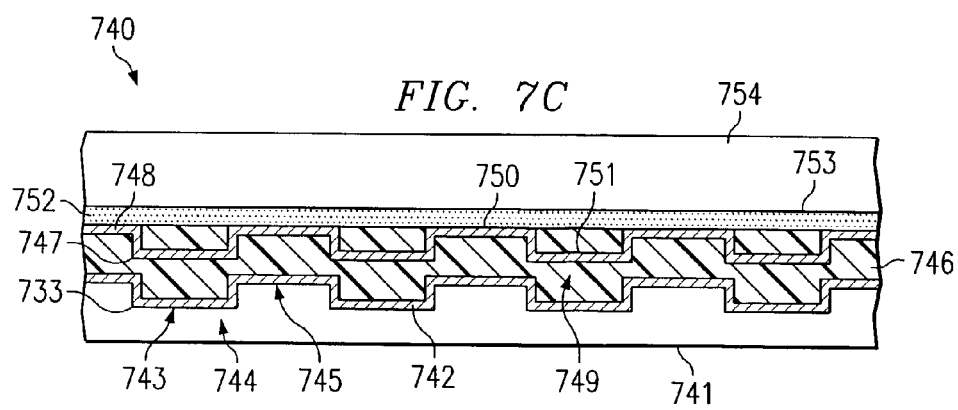
FIG. 7C depicts a cross-section of a sixth exemplary reflective member in accordance with an embodiment of the present invention.

For example, FIGS. 7A-7C depicts cross-sections of embodiments of reflective member 220 (FIG. 2) comprising materials used in DVDs. For example, in FIG. 7A, reflective member 700 comprises a transparent layer 701. Transparent layer 701 may comprise any transparent material, known or later developed. In one embodiment, transparent layer 701 comprises plastic, such as polycarbonate plastic. One or more indentations 709 may be formed in transparent layer 701 (e.g., by mechanically impressing the indentations therein).

In addition to or in the alternative of transparent layer 701, reflective member 700 may comprise reflective layer 702. Reflective layer 702 may be situated adjacent to transparent layer 701. Reflective layer 702 may comprise any material, now known or later developed, operable to reflect energy signals (e.g., laser light). Non-limiting examples of such materials include aluminum and/or other metals, as well as alloys thereof.

Similar to earlier discussions, in the illustrated embodiment, undulations in reflective layer 702, due, at least in part, to indentations 709, form reflective pattern 703. In one embodiment, first portion 704 thereof reflects the aforementioned signals focused thereon by emitter 210 (FIG. 2) (i.e., first portion 704 comprises a window), while second portion 705 does not (i.e., second portion 705 comprises a bar). In an alternative embodiment, both first portion 704 and second portion 705 reflect signals. However, those signals reflected by first portion 704 have different characteristics than those signals reflected by second portion 705 (e.g., are 180° out of phase). Also similar to earlier discussions, first portion 704 is sometimes referred to as a "land", while second portion 704 is sometimes referred to as a "bump" or a "pit". In one embodiment, first portion 704 may have dimensions as small as 0.32 µm in length, 0.4 µm in width, and 0.12 µm in height. Second portion 705 may have at least one dimension equal to that of first portion 704.

Reflective pattern 703 may comprise other lands and pits besides first portion 704 and second portion 705. Moreover, these other portions of reflective pattern 703 may have sizes and/or reflective properties different from those of first portion 704 and/or second portion 705. In the illustrated embodiment, reflective pattern 703 comprises a repeating pattern of first portion 704 and second portion 705.

As mentioned, reflective member 220 may comprise materials used in DVDs. In existing DVDs, lands and pits are arranged in a spiral-pattern. However, in the illustrated embodiment, reflective pattern 703 is circular-shaped.

In addition to the above, reflective member 700 may comprise other layers. For example, in one embodiment, reflective member 700 comprises a lacquer layer 706 situated adjacent to reflective layer 702. Reflective member 700 may also comprise an adhesive layer 707 for bonding the other layers of reflective member 700 to substrate 708, e.g., to increase the thickness of reflective member 700. In one embodiment, reflective member 700 has a thickness of 0.6 mm without substrate 708, and a thickness of 1.2 mm with substrate 708. Lacquer layer 706, adhesive layer 707, and substrate 708 may comprise any material suitable for use in DVDs.

FIG. 7B depicts yet another embodiment of reflective member 220. Reflective member 720 is similar to reflective member 700. For example, in the illustrated embodiment, reflective member 720 comprises the earlier-discussed transparent layer 701, reflective layer 702, reflective pattern 703, lacquer layer 706, and adhesive layer 707 of reflective member 700.

However, in one embodiment, reflective member 720 comprises another transparent layer 726. Similar to transparent layer 701, transparent layer 726 may comprise any transparent material, known or later developed. For example, transparent layer 726 may comprise a plastic, such as polycarbonate plastic. Moreover, one or more indentations 728 may be formed in transparent layer 726 (e.g., by mechanically impressing the indentations therein).

In addition or in the alternative, reflective member 720 comprises an additional reflective layer 722 situated on the opposite side of adhesive layer 707 from reflective member 702 (i.e., reflective member 720 comprises a dual-sided reflective member). Reflective layer 722 may comprise any material, now known or later developed, operable to reflect energy signals (e.g., laser light). Non-limiting examples of such materials include aluminum and/or other metals, as well as alloys thereof.

Similar to reflective pattern 703, undulations in reflective layer 722, due, at least in part, to indentations 729, form reflective pattern 723. In one embodiment, first portion 724 of reflective pattern 722 may reflect signals from emitter 210 (i.e., first portion 724 comprises a window) and/or another emitter of system 200, while second portion 725 does not (i.e., second portion 725 comprises a bar). In an alternative embodiment, both first portion 724 and second portion 725 reflect signals. However, those signals reflected by first portion 724 have different characteristics than those signals reflected by second portion 725 (e.g., are 180° out of phase). Also similar to earlier discussions, first portion 724 is sometimes referred to as a "land", while second portion 725 is sometimes referred to as a "bump" or a "pit". In one embodiment, first portion 724 may have dimensions as small as 0.32 µm in length, 0.4 µm in width, and/or 0.12 µm in height. Second portion 725 may have at least one dimension equal to that of first portion 724.

Reflective pattern 723 may comprise other lands and pits besides first portion 724 and second portion 725. Moreover, these other portions of reflective pattern 723 may have sizes and/or reflective properties different from those of first portion 724 and/or second portion 725. In the illustrated embodiment, reflective pattern 723 comprises a repeating pattern of first portion 724 and second portion 725. Similar to reflective pattern 703, reflective pattern 723 may be circular-shaped.

In addition to the above, reflective member 700 may comprise a lacquer layer 721 situated adjacent to adhesive layer 707. Lacquer layer 721 may comprise any lacquer material suitable for use in DVDs. In one embodiment, reflective member 720 is 1.2 mm thick.

FIG. 7C depicts yet another embodiment of reflective member 220 (FIG. 2). Reflective member 740 is similar to reflective member 720. For example, like reflective member 720, reflective member 740 comprises at least two reflective patterns. However, unlike reflective member 720, the reflective patterns of reflective member 740 are situated on the same side of an adhesive layer of reflective member 740 (i.e., reflective member 740 comprises a dual-layer reflective member).

Reflective member 740 comprises a transparent layer 741. Transparent layer 741 may comprise any transparent material, known or later developed. In one embodiment, transparent layer 741 comprises plastic, such as a polycarbonate plastic. One or more indentations 755 may be formed in transparent layer 741 (e.g., by mechanically impressing the indentations therein).

A reflective layer 742 may be situated adjacent to transparent layer 741. Reflective layer 702 layer comprises translucent material. Such translucent material may be any translucent material, now known or later developed (e.g., the translucent material used in existing DVDs).

Similar to earlier discussions, in the illustrated embodiment, undulations in reflective layer 742, due, at least in part, to indentations 755, form reflective pattern 743. In one embodiment, first portion 744 thereof reflects the aforementioned signals from emitter 210 (i.e., first portion 744 comprises a window), while second portion 745 does not (i.e., second portion 745 comprises a bar). In an alternative embodiment, both first portion 744 and second portion 745 reflect signals. However, those signals reflected by first portion 744 have different characteristics than those signals reflected by second portion 745 (e.g., are 180° out of phase). Also similar to earlier discussions, first portion 744 is sometimes referred to as a "land", while second portion 745 is sometimes referred to as a "bump" or a "pit". In one embodiment, first portion 744 may have dimensions as small as 0.32 μm in length, 0.4 μm in width, and 0.12 μm in height. Second portion 745 may have at least one dimension equal to that of first portion 744.

Reflective pattern 743 may comprise other lands and pits besides first portion 744 and second portion 745. Moreover, these other portions of reflective pattern 743 may have sizes and/or reflective properties different from those of first portion 744 and/or second portion 745. In the illustrated embodiment, reflective pattern 743 comprises a repeating pattern of first portion 744 and second portion 745. Reflective pattern 743 may be circular-shaped.

Reflective member 740 also comprises a lacquer layer 746 situated adjacent to reflective layer 742. Lacquer layer 746 may comprise any lacquer material suitable for use in DVDs. Similar to transparent layer 741, one or more indentations 747 are formed in lacquer layer 746.

A second reflective layer 748 may be situated adjacent lacquer layer 746. Reflective layer 748 may comprise any material, now known or later developed, operable to reflect energy signals (e.g., laser light). Non-limiting examples of such materials include aluminum and/or other metals, as well as alloys thereof.

In the illustrated embodiment, undulations in reflective layer 748, due, at least in part, to indentations 756, form second reflective pattern 749. In one embodiment, first portion 750 thereof reflects the aforementioned signals from emitter 210 (i.e., first portion 750 comprises a window), while second portion 751 does not (i.e., second portion 751 comprises a bar). In an alternative embodiment, both first portion 750 and second portion 751 reflect signals. However, those signals reflected by first portion 750 have different characteristics than those signals reflected by second portion 751 (e.g., are 180° out of phase). Also similar to earlier discussions, first portion 750 is sometimes referred to as a "land", while second portion 751 is sometimes referred to as a "bump" or a "pit". In one embodiment, first portion 750 may have dimensions as small as 0.32 μm in length, 0.4 μm in width, and 0.12 μm in height. Second portion 751 may have at least one dimension equal to that of second portion 750.

Reflective pattern 749 may comprise other lands and pits besides first portion 750 and second portion 751. Moreover, these other portions of reflective pattern 749 may have sizes and/or reflective properties different from those of first portion 750 and/or second portion 751. Furthermore, the size and/or reflective properties of first portion 750 and/or second portion 751 may be different from that of first portion 743 and/or second portion 744 of reflective pattern 742. In the illustrated embodiment, reflective pattern 749 comprises a repeating pattern of first portion 750 and second portion 751. Reflective pattern 749 may be circular-shaped.

In one embodiment where reflective member 220 (FIG. 2) of encoder system 200 comprises reflective member 740, the focal length of emitter 210 may be altered such that the focus of emitter 210 can be alternated between reflective pattern 742 and reflective pattern 749. In one embodiment, such is accomplished by altering current flowing through a magnetic coil (not shown) surrounding emitter 210.

Reflective member 700 may also comprise lacquer layer 752 situated adjacent to reflective layer 749. Reflective member 740 may also comprise an adhesive layer 753 for bonding the other layers of reflective member 740 to substrate 754. Lacquer layer 752, adhesive layer 753, and substrate 754 may comprise any material suitable for use in DVDs. In one embodiment, reflective member 740 has a thickness of 1.2 mm.

FIG. 8 depicts a cross-section of another embodiment of reflective member 220 (FIG. 2). In FIG. 8, reflective member 800 comprises materials used in recordable DVDs (DVD-Rs). For example, in the illustrated embodiment, reflective member 800 comprises a transparent layer 810. Transparent layer 810 may comprise any transparent material, known or later developed. In one embodiment, transparent layer 810 comprises plastic, such as polycarbonate plastic.

In addition to or in the alternative of transparent layer 810, reflective member 800 may comprise reflective layer 830. Reflected layer 800 may be situated adjacent to transparent layer 810. Reflective layer 830 may comprise any material, now known or later developed, operable to reflect energy signals (e.g., laser light). Non-limiting examples of such materials include gold, silver and/or other metals, as well as alloys thereof.

Recording layer 820, in combination with reflective layer 830, form reflective pattern 840. Recording layer 820 may comprise a dye whose reflectance is changed by the application of energy signals (e.g., laser light) thereto. Non-limiting examples of such dye include photosensitive organic compounds such as cyanine dye, its metal-stabilized derivative, phthalocyanine dye, azo dye, etc.

Moreover, reflective pattern 840 is formed, at least in part, by an energy source (e.g., emitter 210 (FIG. 2)) physically burning at least one portion of recording layer 820. For example, in one embodiment, the aforementioned energy source directs energy signals (e.g., laser light) at recording layer 820 while reflective member 800 is in motion. These energy signals heat an area of recording layer 820 beyond a critical temperature. As a result, the heated area is distorted in some manner. Such distortion may be a bleaching of the dye in that area of recording layer 820, a distortion of transparent layer 810 in that area, or the formation of a bubble in that area of recording layer 820. The size of the distortion depends upon the duration of the exposure of recording layer 820 to the energy signals. Furthermore, for this distorted area of recording layer 820, signals (e.g., laser light) are prevented from reaching reflective layer 830 (i.e., the distortion absorbs and/or redirects the signal). Meanwhile, those areas of recording layer 820 that were not burned, allow signals to reach reflective layer 830.

The aforementioned distorted area of recording layer 820, at least in part, comprises second portion 860 of reflective pattern 840. An area of recording layer 820 that is not altered by the energy source, at least in part, comprises first portion 850 of reflective pattern 840. Thus, for first portion 850, the aforementioned signals focused on reflective member 220 by emitter 210 are able to pass through recording layer 820 and reflect off reflective layer 830 to detector 230. Meanwhile, for second portion 860, the signals may be scattered by the distortion and, therefore, are not reflected to detector 230. In an alternative embodiment, some signals are reflected by second portion 860, but a smaller amount than that which is reflected by first portion 850. Thus, first portion 850 may act as a window, while second portion 860 may act as a bar. In one embodiment, first portion 850 may have dimensions as small as 32 µm in length, 0.4 µm in width, and/or 0.12 µm in height. Second portion 860 may have at least one dimension that is equal in size to that of first portion 850.

More than one distortion may be formed in recording layer 820. Thus, reflective pattern 840 may have portions besides first portion 850 and second portion 860. Moreover, these other portions may have sizes and/or reflective properties different from those of first portion 850 and/or second portion 860. In the illustrated embodiment, reflective pattern 850 comprises a repeating pattern of first portion 850 and second portion 860. Moreover, reflective pattern 840 may have a circular-shape.

In addition to the above, reflective member 800 may comprise other layers. For example, in one embodiment, reflective member 800 comprises a lacquer layer 870 situated adjacent to reflective layer 850. Reflective member 800 may also comprise an adhesive layer 880 for bonding the other layers of reflective member 800 to substrate 890 (e.g., to increase the thickness of reflective member 800). Protective layer 870, adhesive layer 880, and substrate 890 may comprise any material suitable for use in DVDs, now known or later developed. A label (not shown) may be printed on substrate 890. Reflective member 800 may also comprise land grooves for guiding the aforementioned energy source during the aforementioned burning process and/or land pre-pits for addressing purposes. It will also be appreciated that reflective member 800 may comprise a dual sided reflective member (i.e., a second reflective pattern may be situated on the side of adhesive layer 808 opposite that of reflective pattern 840). In one embodiment, reflective member 800 has a thickness of 0.6 mm. In an alternative embodiment, reflective member 800 has a thickness of 1.2 mm.

FIG. 9 depicts a cross-section of yet another exemplary embodiment of reflective member 220 (FIG. 2). In FIG. 9, reflective member 900 comprises materials used in DVD-RAMs, DVD–RWs, and/or DVD+RW. For example, reflective member 900 comprises transparent layer 910. Transparent layer 910 may comprise any transparent material, known or later developed. In one embodiment, transparent layer 910 comprises plastic, such as polycarbonate plastic.

Furthermore, reflective member 900 comprises reflective layer 930. Reflective layer 940 may comprise any material, now known or later developed, which is operable to reflect energy signals (e.g., laser light). Non-limiting examples of such materials include aluminum and/or other metals, as well as alloy thereof.

Recording layer 920, in combination with reflective layer 930, may form reflective pattern 950. Recording layer 920 may comprise a phase-change material. In one embodiment, this phase-change material comprises a crystalline compound operable to obtain a crystalline structure when heated to a first temperature and allowed to cool, as well as being operable to obtain a non-crystalline structure (e.g., an amorphous structure) when heated to a different temperature and allowed to cool. In one embodiment, this crystalline compound comprises a mix of silver, indium, antimony and tellurium. It will be appreciated, however, the recording layer 920 may comprise other phase-change materials.

Furthermore, to form reflective pattern 950, an energy source (e.g., emitter 210 (FIG. 2)) physically burns at least one portion of recording layer 920. For example, in one embodiment, initially, the aforementioned crystalline compound is in a crystalline state. However, the earlier-discussed energy source directs energy signals (e.g., laser light) at recording layer 920 while reflective member 900 is in motion. As a result, an area of recording layer 920 is heated beyond a critical temperature (e.g., 500-700° C.), such that all the atoms in this area can move rapidly in the liquid state. Then, if cooled sufficiently quickly, the random liquid state is locked in and an amorphous state is obtained. The size of this amorphous area depends upon the duration of the exposure of recording layer 920 to the energy signals.

This area of recording layer in the amorphous state, at least in part, comprises second portion 970 of reflective pattern 950. An area of recording layer 920 that is not altered by the energy source (i.e., an area in the crystalline state) comprises first portion 960. The crystalline area allows signals to pass therethrough, while the amorphous area absorbs at least a portion of the signals. As a result, for first portion 960, the aforementioned signals from emitter 210 are able to pass through recording layer 920 and reflect off of reflective layer 930 towards detector 230. Meanwhile, for second portion 970, at least a portion of the signals are absorbed by the amorphous material, and therefore, fewer signals, if any at all, are reflected to detector 230. Thus, in the illustrated embodiment, first portion 960 acts as a window, while second portion 970 acts as a bar. In one embodiment, first portion 960 may have dimensions as small as 32 μm in length, 0.4 μm in width, and/or 0.12 μm in height. Second portion 970 may have at least one dimension that is equal in size to that of first portion 960.

More than one amorphous area may be formed in recording layer 920. Thus, reflective pattern 950 may have portions besides first portion 960 and second portion 970. Moreover, these other portions may have sizes and/or reflective properties different from those of first portion 960 and/or second portion 970. In the illustrated embodiment, reflective pattern 950 comprises a repeating pattern of first portion 960 and second portion 970. Furthermore, reflective pattern 950 may be in the shape of a circle.

The areas of recording layer 950 in the amorphous state may be returned to the crystalline state by heating such areas (e.g., by the aforementioned energy source) to below the melting temperature of the crystalline compound but above the crystallization temperature (e.g., 200° C.) for a sufficient time (at least longer than the minimum crystallization time) to revert the atoms back to the crystalline state. These areas and/or other areas of recording layer 920 may then be transformed to the amorphous state via the above-described process.

In one embodiment, reflective member 900 also comprises dielectric layers (not shown) that sandwich reflective layer 920. These layers may draw excess heat from recording layer 920 during the aforementioned burning process. In addition or in the alternative, reflective member 900 may comprise a lacquer layer 970 situated adjacent to reflective layer 930. Reflective member 900 may also comprise an adhesive layer (not shown) for bonding the other layers of reflective member 900 to a substrate (not shown), e.g., to increase the thickness of reflective member 900. Protective layer 940, as well as the earlier-discussed adhesive layer and substrate, may comprise any material suitable for use in DVDs, now known or later developed. Reflective member 900 may also comprise land grooves, wobble grooves, etc., for guiding the aforementioned energy source during the earlier-discussed burning process and/or land pre-pits for addressing purposes. It will also be appreciated that reflective member 900 may comprise a dual sided reflective member (i.e., a second reflective pattern may be situated on the side of the adhesive layer opposite that of reflective pattern 950). In one embodiment, reflective member 900 has a thickness of 1.2 mm. In an alternative embodiment, reflective member 900 has a thickness of 0.6 mm.

It will be appreciated that the elements of the respective reflective member embodiments depicted in FIGS. 4 through 9, as well as the arrangement of these elements, are by way of example only. For example, the above-discussed reflective members may comprise more than two reflective patterns.

Exemplary steps of a method 1000 for assembling reflective member 220 in accordance with an embodiment of the present invention are depicted in FIG. 10. In the illustrated embodiment, a transparent layer is formed (step 1010). This transparent layer may comprise any transparent material, now known or later developed. In one embodiment, the transparent layer is formed by injection molding a layer of polycarbonate plastic.

In some embodiments, after the transparent layer is formed, a recording layer is formed thereon (step 1020). This recording layer may comprise the aforementioned dyes of recording layers 520 and 820 and/or the phase-change materials of recording layers 630 and 920. The recording layer may be formed by any deposition technique, now known or later developed, suitable for the deposition of the aforementioned recording layer materials.

Moreover, in one embodiment, after the formation of the transparent layer and/or the recording layer, a first reflective layer is formed (step 1030). Similar to earlier discussions, this reflective layer may comprise any reflective material, now known or later developed. Non-limiting examples of such materials include aluminum, gold, silver, and/or other metals, as well as their alloys. Moreover, in one embodiment, this first reflective layer comprises a translucent material. The first reflective layer may be deposited on the transparent layer. In an alternative embodiment, however, the first reflective layer is deposited on the recording layer. The above-discussed deposition may occur via any means, now known or later developed, for the deposition of reflective materials.

After the first reflective layer is formed, one or more additional reflective layer(s) may be formed (step 1040). In some embodiments, these reflective layers are situated on the same side of an adhesive layer of reflective member 220 as the aforementioned reflective layer. However, in addition to or in the alternative of the above, one or more of these additional reflective layers may be situated on the opposite side of the adhesive layer from the first reflective layer. Similar to the above, these additional reflective layer(s) may comprise any material, now known or later developed, that is operable to reflect signals. Moreover, the additional layers may be formed by any means, now known or later developed, for the deposition of reflective materials.

Before, during, and/or after any or all of the above steps, a reflective pattern comprising at least a first portion having a first reflective property and a second portion having a different reflective property is formed (step 1050). Moreover, this reflective pattern may comprise a repeating pattern of these first and second portions. The width of the aforementioned first portion may be less than half of the grating period, such as less than 1.6 μm. In some embodiments, the first portion has a width less than or equal to 0.83 μm. In other embodiments, the first portion has a width less than or equal to 0.4 μm.

In one embodiment, as part of forming the aforementioned reflective pattern, indentations are made in a surface of the aforementioned transparent layer during the formation thereof (step 1060). In one embodiment, these indentations are formed by mechanically pressing, e.g., a stamp, a plate, etc., into a surface of the transparent layer. The first reflective layer is then deposited onto this surface (step 1070). As part of such, reflective layer material is deposited into one of the earlier-mentioned indentations, thus forming the aforementioned first portion of the reflective pattern. Reflective layer material is also deposited onto a non-indented portion of the aforementioned surface that is adjacent to the first portion of the reflective pattern, thus forming the second portion of the reflective pattern.

In an alternative embodiment, the reflective pattern is formed by exposing the aforementioned recording layer to an energy source (e.g., a laser, magnetic element, heat, and the like) in the manner discussed earlier with respect to FIGS. 5, 6, 8, and 9 (step 1080). As discussed therein, a portion of the recording layer that was exposed to the energy source comprises at least a part of the second portion, while a portion that was not exposed comprises at least a part of the first portion.

In other alternative embodiments, the reflective pattern is formed via the aforementioned additional reflective layer(s) (step 1090). In one of these embodiments, indentations are formed in a surface of a lacquer layer deposited on the first reflective layer. The additional reflective layer is then deposited on the surface. As part of such, reflective layer material is deposited into one of the earlier-mentioned indentations in the surface of the lacquer layer, thus forming the aforementioned first portion of the reflective pattern. Reflective layer material is also deposited onto a non-indented portion of the aforementioned surface that is adjacent to the first portion of the reflective pattern, thus forming the second portion of the reflective pattern.

It will be appreciated that steps depicted in FIG. 10 are by way of example only. Method 1000 may comprise more, fewer, and/or different steps than those depicted in FIG. 10, as well as performed in a different order than that depicted in FIG. 10. For example, in some embodiment, the manufacture of reflective member 220 (FIG. 2) does not involve the formation of a reflective member. Similarly, in some embodiments, the manufacture of reflective member 220 does not involve the formation of additional reflective layers. Moreover, method 1000 may comprise the formation and/or provision of layers other than those described above, such as dielectric layers, substrate layers, pre-grooves, landing pre-pits, etc.

Various embodiments of the present invention alleviate difficulties associated with the prior art. For example, in some embodiments, by employing materials and/or manufacturing techniques used for CDs, DVDs, and/or other similar technologies, a higher number of "bar and window" pairs, and, therefore, a higher resolution, than that which was previously possible, may be realized for codestrips, codewheels, and/or the like. Such methods may allow miniturization, which would be an advantage. Moreover, because the manufacture of CDs and DVDs is a relatively inexpensive process, substantial cost savings in the manufacture of codewheels, codestrips, and/or the like may be achieved.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A reflective member for use in an encoder system, said reflective member comprising
    a reflective layer;
    at least another layer; and
    a reflective pattern, said reflective pattern comprising a first portion having a first reflective property and at least one other portion having a different reflective property;
    wherein said reflective layer forms at least a part of said reflective pattern;
    wherein said first portion of said reflective member has a width of at most one-half of a grating period; and
    wherein said reflective member enables measurement of at least one operational attribute of an object associated with said reflective member.

2. The reflective member of claim 1 wherein said at least one operational attribute comprises at least one attribute selected from the group consisting of a linear speed of the object, a rotary speed of the object, a direction of movement of the object, a linear position of the object, a rotary position of the object, a displacement of the object, a rotation angle of the object, an acceleration of the object, and a frequency of the object.

3. The reflective member of claim 1 wherein said reflective pattern comprises a repeating pattern of said first portion and said other portions.

4. The reflective member of claim 1 wherein said first and at least one of said other portions are of the same width.

5. The reflective member of claim 1 wherein said first portion has a width less than or equal to 1.6 µm.

6. The reflective member of claim 1 wherein said first portion has a width less than or equal to 0.83 µm.

7. The reflective member of claim 1 wherein said first portion has a width less than or equal to 0.4 µm in width.

8. The reflective member of claim 1 wherein said at least another layer comprises a recording layer; and
    wherein said reflective layer and said recording layer form said repeating pattern.

9. The reflective member of claim 1 wherein said at least another layer comprises a transparent layer.

10. The reflective member of claim 1 wherein said transparent layer comprises a polycarbonate plastic layer.

11. The reflective member of claim 1 wherein said at least another layer comprises another reflective layer; and
    wherein said another reflective layer forms at least a part of said another reflective pattern comprising a first portion having a first reflective property and at least one other portion having a different reflective property.

12. The reflective member of claim 1 wherein said reflective pattern has a circular shape.

13. The reflective member of claim 1 wherein said reflective member comprises a codestrip.

14. The reflective member of claim 1 wherein said reflective member comprises a codewheel.

15. An encoder system for associating with an object, said system comprising
    an emitter;
    a detector; and
    a reflective member, said reflective member comprising
        a reflective layer;
        at least one other layer; and
        a reflective pattern, wherein said reflective pattern comprises at least a first portion having a first reflective property and a second portion having a different reflective property, wherein said first portion has a width of at most one-half of a grating period, and wherein said reflective layers form at least a part of said reflective pattern;
    wherein said detector is operable to collect a reflected signal pattern comprising signals reflected by said reflective member; and
    wherein said encoder system is operable to measure at least one operational attribute of an object to which it has been associated, said measured attribute derived from said collected signal pattern.

16. The system of claim 15 wherein said emitter comprises a light emitter;
    wherein said detector comprises a light detector; and
    wherein said reflected signal pattern comprises a reflected light pattern.

17. The system of claim 16 wherein said light emitter comprises one of:

an infrared laser;
a red laser;
a blue laser;
an ultra violet laser.

18. The system of claim 15 wherein said at least one of said operational attributes comprises at least one attribute selected from the group consisting of a linear speed of the object, a rotary speed of the object, a direction of movement of the object, a linear position of the object, a rotary position of the object, a displacement of the object, a rotation angle of the object, an acceleration of the object, and a frequency of the object.

19. The system of claim 15 wherein said reflective pattern comprises a repeating pattern of said first portion and second portion.

20. The system of claim 15 wherein said reflective member further comprises a transparent layer.

21. The system of claim 15 wherein said first portion has a width less than or equal to 1.6 μm.

22. The system of claim 15 wherein said first portion has a width less than or equal to 0.83 μm.

23. The system of claim 15 wherein said first portion has a width less than or equal to 0.4 μm.

24. The system of claim 15 wherein the width of said first portion is equal the width of said second portion.

25. A method for forming a reflective member for use in enabling measurement of at least one operational attribute of an object, said method comprising
forming a reflective layer;
forming at least one other layer; and
forming a reflective pattern comprising said reflective layer and said at least one other layer, said reflective pattern comprising at least a first portion having a first reflective property and a second portion having a different reflective property.

26. The method of claim 25 wherein the width of said first portion is less than 1.6 μm.

27. The method of claim 25 wherein said reflective pattern comprises a repeating pattern of said first portion and said second portion.

28. The method of claim 25 wherein said at least another layer comprises a transparent layer; and wherein said forming of said reflective pattern comprises
forming indentations in a surface of said transparent layer as part of said forming of said a least another layer; and
depositing said reflective layer onto said surface as part of said forming of said reflective layer.

29. The method of claim 25 wherein said at least another layer comprises a recording layer, and wherein said forming of said reflective pattern comprises exposing said reflective layer to an energy source so as to change a reflective property of at least a portion of said reflective layer.

30. The method of claim 25 wherein said at least another layer comprises another reflective layer; and
wherein said forming of said reflective pattern comprises forming said reflective pattern via said another reflective layer.

31. The method of claim 25 wherein said first portion has a width less than or equal to 0.83 μm.

32. The method of claim 25 wherein said first portion has a width less than or equal to 0.4 μm.

* * * * *